United States Patent [19]

Bennett

[11] Patent Number: 4,832,529

[45] Date of Patent: May 23, 1989

[54] METHOD FOR REPAIRING AIR CORE CABLE

[75] Inventor: David J. Bennett, Hot Springs, Ark.

[73] Assignee: Share Corp., Milwaukee, Wis.

[21] Appl. No.: 96,715

[22] Filed: Sep. 14, 1987

[51] Int. Cl.⁴ ............................................... H02G 1/00
[52] U.S. Cl. ...................................... 405/154; 156/48;
174/37; 405/156; 405/303
[58] Field of Search ...................... 405/154, 156, 303;
156/48; 174/37

[56] References Cited

U.S. PATENT DOCUMENTS

| 3,615,959 | 10/1971 | Nance | 156/48 X |
| 3,830,953 | 8/1974 | Wood et al. | 156/48 X |
| 3,876,487 | 4/1975 | Garrett et al. | 156/48 X |
| 4,372,988 | 2/1983 | Bahder | 156/48 X |
| 4,451,692 | 5/1984 | Classens et al. | 156/48 X |
| 4,553,877 | 11/1985 | Edvardsen | 405/154 |
| 4,580,002 | 4/1986 | VeCellio et al. | 156/48 X |

Primary Examiner—Dennis L. Taylor
Attorney, Agent, or Firm—Michael, Best & Friedrich

[57] ABSTRACT

A method for reconditioning a length of air core cable and for discharging moisture from the cable. Gas under pressure is forced into one end of the cable to cause discharge of moisture from an opposite end of the cable. A quantity of fluid solvent and lubricant is injected into the end of the cable and forced by gas under pressure as a unitary charge along the length of the cable.

5 Claims, 1 Drawing Sheet

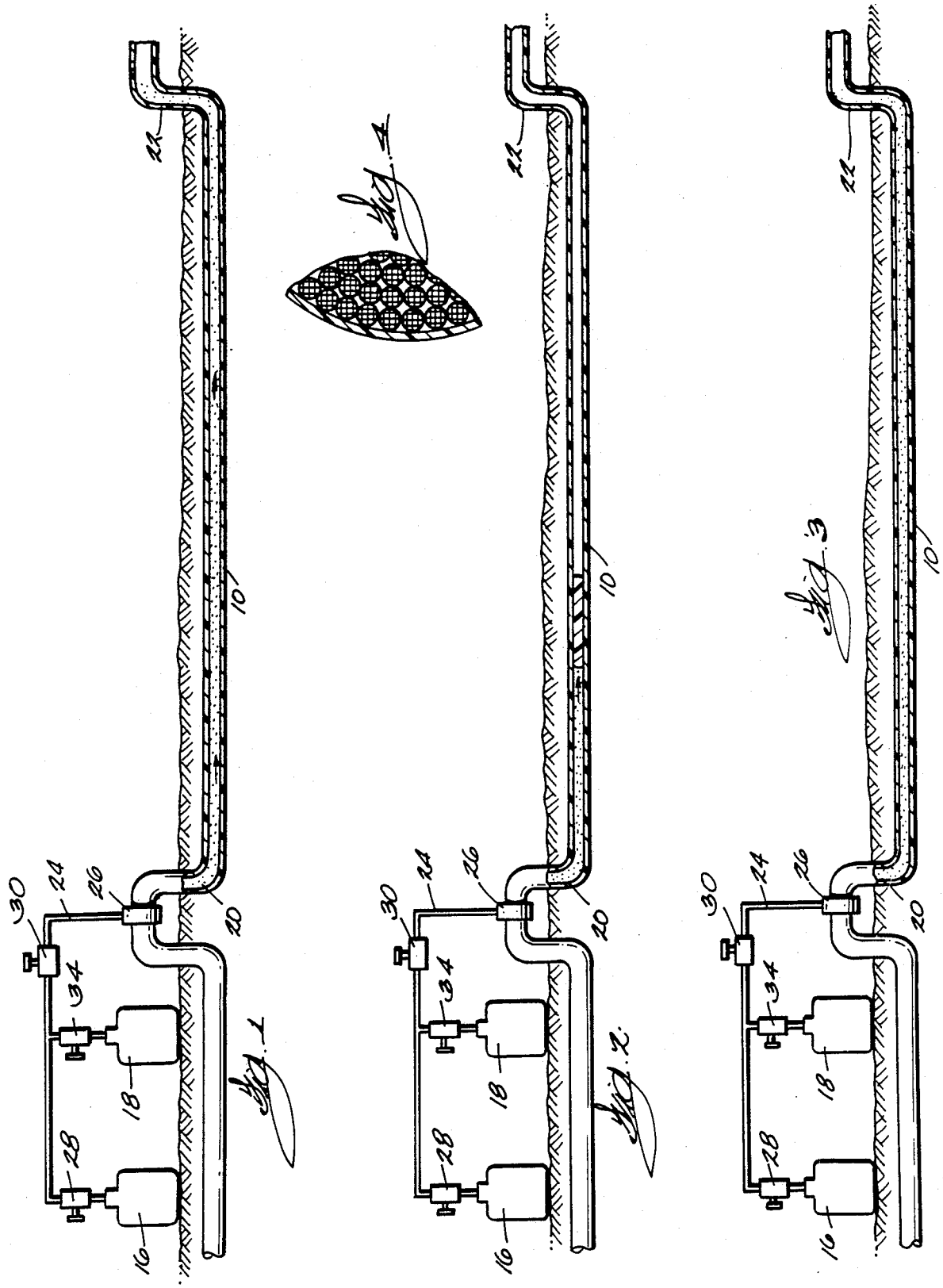

METHOD FOR REPAIRING AIR CORE CABLE

FIELD OF THE INVENTION

The invention relates to a method for maintaining underground air core telephone cable and more particularly to a method for removing moisture from an air core cable and for restoring the insolution material surrounding the wires included in the air core cable.

BACKGROUND PRIOR ART

The telephone industry uses thousands of miles of buried or underground air core cable to transmit telephone signals. These air core cables commonly comprise 100 or more tansmission wire pairs encased in a plastic sheath. In some applications the cables may be much larger and carry far larger numbers of wire pairs. These buried cables can collect internal moisture which results in undesirable changes in the capacitance between the wires of the wire pairs as well as corrosion and shorting of the wire pairs. Conventionally, when these moisture problems occur, the telephone companies are requred to dig up and replace the telephone cable. The cable is expensive, and the labor involved in digging up and replacing long sections of cable is costly.

In an effect to avoid these high maintenance costs, some telephone companies have sought to cure the effects of moisture in a cable by blowing dry air through the cable to remove moisture. These maintenance efforts require discharge of air through the cables for extended periods of time, and once completed, may be only temporary because moisture may reenter the cable. Additionally, the discharge of air through the cable does not cure problems caused by the formtion of corrosion or shorting of the wire pairs. That corrosion will continue to cause detrioration of the electrical transmission capability of the wire pairs in the cable.

In other prior art efforts to cure these problems in telephone transmission, various liquids have been injected into the cable in an effort to remove the moisture from the cable and dissolve corrosion, but such efforts have been unsuccessful.

SUMMARY OF THE INVENTION

The present invention provides an improved method for reconditioning air core cable and includes a means for discharging moisture from the cable, curing the effects of corrosion in the cable caused by the presence of moisture in the cable and sealing the cable against the reentry of moisture into the cable while also providing a means for protecting the wire pairs in the cable against the effects of moisture if moisture reenters the cable after the reconditioning process.

More specifically, the invention includes a method for reconditioning telephone cable including the steps of discharging gas under pressure into one end of a length of cable to cause moisture in the length of cable to be driven to the opposite end of the length of cable. Subsequently a mass of fluid lubricant is forced into the one end of the length of cable, and gas is then injected into the length of cable to force the liquid lubricant as a slug or unitary charge along the entire length of the cable.

Various features and advantages of the invention will be apparent by reference to the following description of a preferred embodiment, from the claims, and from the drawings.

BRIEF DESCRIPTION OF THE DRAWINGS

FIG. 1 is a schematic view of a method step of the invention wherein gas under pressure is injected into one end of a length of telephone cable.

FIG. 2 is a schematic view similar to FIG. 1 of a second method step of the invention wherein a charge of fluid lubricant is forced through the length of telephone cable.

FIG. 3 is a view similar to FIGS. 1 and 2 and shows a third method step of the invention wherein gas under pressure discharges the charge of fluid lubricant from the length of telephone cable.

FIG. 4 is an enlarged cross section view of a portion of the cable illustrated in FIGS. 1 through 3.

Before describing a preferred embodiment of the invention in detail, it is to be understood that the invention is not limited to the details of construction and to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is a length of air core cable of the type used in the telephone industry for transmission of signals. Such air core cable includes a sheath 12 housing a large number of pairs of telephone signal transmission wires 14 (FIG. 4). For convenience of illustration the air core cable 10 is shown as having a relatively few number of wire pairs 14, but it will be understood by those skilled in the art that air core cables will commonly include 100 or more wire pairs. Additionally, while the invention will be described as for use in reconditioning a telephone cable, it should be understood that the invention has application in repair of cables used in other appications and is not restricted to use in connection with telephone cables.

During the intended useful life of a cable such as that illustrated in FIG. 1, moisture may enter portions of the cable 10, and insulation surrounding the wire pairs 14 may deteriorate, or there may be corrosion thereby causing shorting of the wire pairs. The presence of moisture in the cable also affects the capacitance between wire pairs and affects the transmission capability of the cable.

Also illustrated in FIG. 1 is apparatus for use in practicing the method of the invention and for use in reconditioning the section of cable illustrated. The apparatus includes a container 16 housing a quantity of gas under pressure and a container 18 housing liquid or fluid lubricant under pressure, the compressed gas and the fluid lubricant being adapted to be selectively and alternatively injected into one end of the cable 10.

In a preferred form of the method of the invention, initially pressurized gas from container 16 is injected into one end 20 of the cable 10 to cause moisture in the cable to be driven along the length of the cable and to be discharged from the opposite end 22 of the cable. In one form of the invention the pressurized gas forced through the cable is compressed nitrogen gas supplied to the end 20 of the cable at a pressure of approximately 30 psi. While various means could be provided for delivering gas under pressure to the end of the section of cable, in the illustrated arrangement the tank 16 containing compressed nitrogen is connected by a line 24 to the end 20 of the section of cable. One end of the line 24 is connected by a fluid tight saddle or collar 26 to the cable sheath so as to permit gas to be injected under pressure into the end 20 of the cable. Valves 28 and 30 are also provided to control flow of gas from the tank 16 to the air core cable 10.

As the nitrogen gas is injected into the cable, moisture in the cable 10 will be blown toward the discharge end 22 of the cable, and as the gas flows through the cable, additional moisture in the cable will be absorbed by the gas and will be discharged from the cable. While the fluid lubricant could be injected into the cable under higher pressure, in practice it has been found that such a pressure is sufficient to force the moisture from the length of the cable. Subsequently higher pressures can result in damage to the cable. As the nitrogen gas is injected into the cable, the operator can also determine whether there are any obstructions in the cable. While in one embodiment of the invention, nitrogen gas is used, it will be understood that compressed air or other types of compressed gas could also be used. Subsequent to injection of the nitrogen gas through the length of cable, a charge of liquid lubricant is then supplied to the end of the cable. In a preferred form of the invention the liquid lubricant can comprise a lubricant product sold under the designation "655" and manufactured by Filmite Oil Co., Butler, Wis. The liquid lubricant generally comprises a composition including 50% light lubricating oil, approximately 15% of Stoddard solvent, and 35% other lubricant fluids.

While the charge of fluid lubricant can be supplied to the end of the cable in various ways, in the illustrated arrangement, the fluid lubricant is housed in the tank 18 and maintained under pressure. In the illustrated arrangement, the tank can be maintained under pressure. The tank is connected by a valve 34 to the hose 24. After the charge of compressed gas is directed through the cable 10 to cause the moisture to be discharged from the cable, the valve 34 of the fluid lubricant tank 18 is opened, and a charge of fluid lubricant is directed into the cable. In practice it has been found that sections of cable as long as 1000 feet can be effectively treated using the method embodying the invention. If the cable has a length of approximately 1000 feet, a charge comprising 7 to 10 gallons of lubricant should be injected into the end of the cable.

Immediately following injection of the fluid lubricant into the cable, the pressurized gas is again connected to the cable to force the fluid lubricant through the cable as a unitary charge or slug of material 36 (FIG. 2) from one end of the cable to the other wherein the charge of fluid is discharged from the end of the cable.

As the charge of fluid lubricant moves through the cable, any remaining moisture in the cable will be pushed through the cable ahead of the charge of fluid. Additionally, while it is not completely understood how the fluid lubricant functions in reconditioning the wire pairs in the cable, it appears in practice that the fluid lubricant coats the wires in the cable with lubricant and functions to separate the wires from one another, with a coating of fluid lubricant surrounding each of the wires housed in the cable. The fluid injected into the cable also includes a solvent having the capability of dissolving bonds such as salt bridges between pairs of wires to thereby facilitate separation of these wires and also functioning to dissolve corrosion in the cable.

After the charge of lubricant has been forced through the cable, nitrogen gas will be once again injected through the cable to discharge excess fluid lubricant from the cable. Some of the fluid lubricant will remain in the cable as a coating for the individual wires in the cable. The remainder of the charge of fluid lubricant will be discharged from the end of the cable. Subsequently the opposite ends of the cable sheath are once again sealed to bar entry of moisture into the cable and another section of the cable can then be treated in the manner described above.

The method described above has the advantage of providing a means for positively discharging all of the moisture from a section of air core telephone cable while also providing means for separating wires of the cable from one another and coating those wires with a lubricant to improve the insulation layers between the wire pairs. The fluid lubricant used in the practice of the method described above has the capability of dissolving areas of connection between pairs of wires to improve the separation of the wires and also provides for a lubricating coating surrounding the wires. Additionally, the fluid lubricant material has a viscosity which permits its injection into the end of the cable and permits propagation of the fluid lubricant in the form of a unitary charge along the length of the cable section.

Various features of the invention are set forth in the following claims.

I claim:

1. A method for treating a section of air core telephone cable having opposite ends and having a sheath and a plurality of wires housed in the sheath to remove moisture from the length of cable and to separate the wires housed in the sheath from one another and to provide a lubricant coating on the wires in the sheath, the method comprising the steps of injecting a charge of fluid lubricant into one of the opposite ends of the cable, the fluid lubricant comprising a mixture of solvent and lubricant and causing the charge of fluid lubricant to move as a unitary mass through the cable from one of the opposite ends of the cable to the other of the opposite ends the step of causing the fluid lubricant to move along the cable including the step of injecting gas under pressure into one end of the cable immediately after injection of liquid lubricant into that end of the cable to thereby cause the mass of fluid lubricant to move along the length of the cable from one end of the cable to the other and to be discharged from said other end of the cable.

2. A method for treating a section of air core telephone cable as set forth in claim 1 and further including the step of forcing gas under pressure into the end of the air core cable before injection of the charge of fluid lubricant into the cable, the step of forcing gas into the cable causing moisture in the cable to be discharged toward the opposite end of the cable.

3. A method for removing moisture from an elongated length of cable having a plurality of wires surrounded by a sheath and the length of cable having opposite ends, and for maintaining an insulative separation of wires in the cable, the method comprising the steps of:

injecting gas into one end of the elongated length of cable whereby moisture in the cable will be driven along the elongated length of cable and expelled at the opposite end of the elongated length of cable, injecting a charge of fluid lubricant into the one end of the elongated length of cable, and injecting gas into the one end of the elongated length of cable to drive the charge of fluid lubricant as a unitary charge through the elongated length of cable from one end of the elongated length of cable to the opposite end wherein the charge of fluid lubricant is discharged from the opposite end of the cable and whereby the liquid lubricant material will drive any remaining moisture in the elongated length of cable toward the opposite end of the elongated length of cable and coat the wires housed in the cable with lubricant.

4. A method as set forth in claim 3 wherein said step of injecting gas into said length of cable to cause moisture inside the cable to be discharged from the opposite end includes a step of injecting nitrogen into the cable at a pressure of approximately 30 psi.

5. A method as set forth in claim 3 wherein the step of injecting liquid lubricant into the cable includes the step of injecting a liquid lubricant including a mixture of fine lubricating oil and solvent.

* * * * *